US006576696B1

(12) United States Patent
Rodriguez et al.

(10) Patent No.: US 6,576,696 B1
(45) Date of Patent: Jun. 10, 2003

(54) DIVALENT METAL STANNATE PRODUCTS

(75) Inventors: Consuelo Espejo Rodriguez, Madrid (ES); Clare Daniels, Hayes (GB); Robin Wainwright, Wokingham (GB); Michael Rai, Hounslow (GB)

(73) Assignee: Alcan International Limited, Montreal (CA)

( * ) Notice: Subject to any disclaimer, the term of this patent is extended or adjusted under 35 U.S.C. 154(b) by 0 days.

(21) Appl. No.: 09/424,904

(22) PCT Filed: Jun. 2, 1998

(86) PCT No.: PCT/GB98/01601

§ 371 (c)(1),
(2), (4) Date: Apr. 5, 2000

(87) PCT Pub. No.: WO98/55541

PCT Pub. Date: Dec. 10, 1998

(30) Foreign Application Priority Data

Jun. 4, 1997 (EP) .............................. 97303852

(51) Int. Cl.$^7$ ............................ C08K 5/04; C08K 5/09; C08K 3/38

(52) U.S. Cl. ................... 524/399; 524/405; 423/89; 252/609

(58) Field of Search ............................... 524/399, 405; 423/89; 252/609

(56) References Cited

U.S. PATENT DOCUMENTS 5,342,874 A  *  8/1994  Chaplin et al. ............. 524/430
5,736,605 A  *  4/1998  Oshima ....................... 524/521

FOREIGN PATENT DOCUMENTS

WO    WO9101348    2/1991

* cited by examiner

*Primary Examiner*—Kriellion A. Sanders
(74) *Attorney, Agent, or Firm*—Cooper & Dunham LLP

(57) ABSTRACT

A divalent metal stannate product having a loss on ignition of 2–17% by weight, e.g. a product intermediate $ZnSn(OH)_6$ and $ZnSnO_3$ has advantageous flame-retardant properties, for use e.g. in polymer formulations.

12 Claims, No Drawings

DIVALENT METAL STANNATE PRODUCTS

Divalent metal stannate products are being increasingly used as flame-retardant additives in polymer formulations. They generally exist in two forms of formula $MSn(OH)_6$, and $MSnO_3$, the latter being readily formed by heating the former to drive off water, and also in a third form of formula $M_2SnO_4$, where M represents the divalent metal. Thus for example zinc hydroxy stannate ($ZnSn(OH)_6$) and zinc stannate ($ZnSnO_3$) have been marketed since 1986 under the trademarks Flamtard H and Flamtard S. Flamtard S is made by heating Flamtard H at 400° C. for a sufficient time to drive off the combined water. Flamtard S commands a premium price—but it has superior thermal stability and is recommended for high temperature formulations.

This invention results from the discovery that an intermediate product has properties which are in some respects better than either Flamtard H or Flamtard S. This discovery was surprising. It was expected that an intermediate product would have intermediate properties.

The invention provides in one aspect a divalent metal stannate product which has a loss on ignition of 2–17% by weight, said product in packaged form for use as a flame-retardant additive. Preferred divalent metals, on account of the economic importance of their stannates are Zn, Mg, Ca, Ba and Bi; most preferred are Bi and particularly Zn.

In compounds where the atomic ratio of the divalent metal to tin is 1, a divalent metal hydroxy stannate has the formula $MSn(OH)_6$. On heating at 400° C., this product is converted to the corresponding divalent metal stannate $MSnO_3$ and gives off 3 moles of water per mole of metal stannate. The term "metal stannate product" is herein used to cover the metal stannate and partially hydrated compounds not including the fully hydrated divalent metal hydroxy stannate.

The loss on ignition of a compound is determined by first drying the compound at 110° C. to constant weight, then heating the compound at 1000° C. to constant weight, and noting the percentage difference between the two. The loss on ignition of divalent metal hydroxy stannates depends on the atomic weight of the divalent metal. For example, the loss is theoretically 18.9% for zinc hydroxy stannate and 12.6% for bismuth hydroxy stannate. The loss on ignition of a divalent metal stannate is in principle zero but may in practice be up to 1.5%.

The divalent metal stannate products of the present invention are characterised by having a loss on ignition of at least 2% preferably at least 4%; but less than the corresponding divalent metal hydroxy stannate. For zinc stannate products the loss on ignition is preferably 2–17% e.g. 4–15%. For bismuth stannate products the loss on ignition is preferably 2–11% e.g. 4–9%. Preferably the divalent metal stannate product has a formula $MSnO_3.xH_2O$ where x is 0.4–2.6 e.g. 0.8–2.2.

These divalent metal stannate products may be made by heating a corresponding divalent metal hydroxy stannate under conditions to drive off a desired proportion of the combined water present. Suitable heating temperatures are 200–350° C. It may be convenient to use the same kind of rotary kiln as is currently used for converting Flamtard H to Flamtard S, e.g. for 2–40 minutes. Of course, that process produces a transient partially dehydrated zinc stannate product, but that transient product is in commercial production never recovered and packaged for use as a flame-retardant additive.

Or the metal hydroxy stannate may be heated in a spin flash dryer, preferably at a temperature from 130° C. to 400° C. Or the metal hydroxy stannate may be heated in a static oven e.g. for 30 minutes to 5 hours. Different heating regimes give rise to slightly different products which may be optimum for different purposes. In general, the heated intermediate product of this invention is white (like Flamtard H) rather than pale yellow (like Flamtard S or a mixture of H and S).

Alternatively the divalent metal stannate products of this invention may be made simply by mixing together the corresponding divalent metal hydroxy stannate and divalent metal stannate in suitable proportion. For example, 90–10 wt % of Flamtard S may be mixed with 10–90 wt % of Flamtard H. This simple mixture has properties which, while generally not as good as those of the heated products, are nevertheless surprisingly superior to both the Flamtard H and the Flamtard S when used separately.

In another aspect the invention provides a polymer formulation containing an effective concentration of a flame-retardant additive which is a divalent metal stannate product as defined, either alone or in admixture with a divalent metal borate. For example, such a mixture may consist of 90% to 10% by weight of the divalent metal stannate product and correspondingly 10% to 90% by weight of the divalent metal borate. Zinc hydroxy stannate and zinc stannate may be added to the polymer formulation either separately or together as a pre-mixture.

Polymer formulations may be those in which zinc (or other metal) hydroxy stannate and zinc (or other metal) stannate are currently used as flame-retardant additives. These include polyurethanes both solid and foam formulations, polyethylene particularly linear low density products, polypropylene, natural and synthetic rubber latex, polyamide, polystyrene, epoxies, neoprene, phenolics, EPDM/EVA blends, and particularly polyvinylchloride formulations. When used in concentrations of 1–30% more usually 5–20%, by weight on the weight of the polymer, these additives provide useful flame-retardant properties.

The following examples relate to intermediate zinc stannate products and blends which are shown to be superior to Flamtard H (commercial zinc hydroxy stannate) and Flamtard S (commercial zinc stannate) in certain respects:

Better critical oxygen index values (for both normal COI and elevated COI).

Electrical properties (improved volume resistivity).

Improved general fire performance (cone calorimeter data).

Reduction in smoke (NBS smoke chamber and cone calorimeter data).

It may be inferred that corresponding improvements would be shown by other divalent metal stannate products such as bismuth stannate products.

EXAMPLE 1

Commercial zinc hydroxy stannate was heated at 300° C. in a laboratory oven for 1.5 hours or 3 hours, to give zinc stannate products according to the invention having a loss on ignition between 4.05% and 16.63%. The products were used as flame-retardant additives in the following polymer formulation (in which figures are in parts by weight per 100 parts by weight of polymer or phr):

| | |
|---|---|
| PVC DS7060 | 100 |
| PhospHate plasticiser (Santicizer 148) | 30 |
| Brominated aromatic ester (DP45) | 20 |
| Alumina trihydrate (SF4E) | 30 |
| Stabiliser (Irgastab 17M) | 7 |
| Stearic acid (Processing aid) | 0.5 |
| Irgawax 371 (Processing aid) | 0.5 |
| Flame retardant (various) | 10 |

The formulations were compounded in a two roll mill at 140° C. and moulded at 150° C. Plaques of 2 mm and 3 mm were moulded for 1 minute under no pressure then 3 minutes under 3000 MPa.

Mechanical properties were tested on a Zwick machine according to BS6469. COI was tested for each sample according to BS2782. Irradiance for cone calorimetry test was 40 kW/m$^2$ for all samples except Flamtard S which was tested at 70 kW/m$^2$. The results are set out in Table 1.

TABLE 1

| FORMULATION | Flamtard HEATED 1.5 h | Flamtard HEATED 3 h | Commercial Flamtard S | Commercial Flamtard H |
|---|---|---|---|---|
| IGNITABILITY | | | | |
| Time to Ignition (s) | 72 | 58 | 22 | 56.5 |
| HEAT RELEASE | | | | |
| Peak HRR (kW/m$^2$) | 134.7 | 126.6 | 147 | 128.5 |
| Time to Peak HRR (s) | 200 | 205 | 130 | 131 |
| Total HR (MJ/m$^2$) | 49.8 | 47.9 | 50.5 | 45.43 |
| SMOKE | | | | |
| Peak RSR (1/s) | 8.31 | 8.99 | 15.82 | 13.21 |
| Total Smoke Release | 2,017 | 2,051.2 | 3,120.6 | 3,242 |
| Average SEA (m$^2$/kg) | 566.1 | 549.9 | 871.6 | 910.2 |
| GAS PRODUCTION | | | | |
| Peak CO (kg/m$^2$s) × 10$^3$ | 1.35 | 1.33 | 1.62 | 1.58 |
| Peak CO$_2$ (kg/m$^2$s) × 10$^3$ | 7.88 | 6.95 | 7.15 | 7.9 |
| FPI (s m$^2$/kW) | 0.53 | 0.46 | 0.15 | 0.44 |
| MECHANICALS | | | | |
| Elongation @ Brk (%) | 228.8 | 238.4 | 163.84 | 152.3 |
| Tear Strength (N/mm) | 13 | 12.5 | 11.69 | 12.0 |
| COI (% O$_2$) | 40.1 | 40.3 | 40 | 39 |

EXAMPLE 2

Various flame-retardant additives were mixed with already compounded EPDM/EVA blends. The formulations were mixed on a two roll mill at 70° C. Then the resulting compounds were compression moulded at 170° C. for 25 minutes under pressure into different thickness plaques. The flame-retardant additives were:

A and B Flamtard H (commercial Zinc hydroxy stannate) added at 10 phr and 15 phr.

C A zinc stannate product according to the invention made by heating Flamtard H at 300° C. for 3 hours as described in Example 1, and used at 10 phr.

D A blend of 6 phr of the said zinc stannate product with 4 phr of zinc borate.

The following tests were performed: COI and elevated temperature COI; and NBS smoke chamber. The results are set out in Table 2.

TABLE 2

| FORMULATION | A 10 phr | B 15 phr | C | D |
|---|---|---|---|---|
| COI (% O$_2$) | 55.7 | 57.7 | 60.3 | 60.3 |
| Elevated temperature COI (° C.) | 290 | 300 | 300 | 320 |
| Specific Optical Density | 130 | 137 | 127 | 126 |

EXAMPLE 3

Commercial zinc hydroxy stannate was heated at 250° C. for 2 hours, then cooled in a dessicator and introduced into a PVC formulation as follows. Commercial zinc stannate Flamtard S was used in a control formulation. The formulation was (in phr):

| | |
|---|---|
| PVC (DS7060) | 100 |
| Ca/Zn stabiliser | 5 |
| Kaolin | 5 |
| CaCO$_3$ | 40 |
| Cereclor S52 (chlorinated aromatic) | 13 |

-continued

| | |
|---|---|
| Dioctyl phthalate | 40 |
| Flame retardant | 5 |

Mixtures were compounded in a two roll mill at 140° C. then compression moulded at 150° C. for 1 minute and then 3 minutes under pressure. Samples were tested in COI and volume resistivity (Digital Super Mehohmmeter DSM-525A) and expressed in (M ohm.km). Cone calorimetry analysis was performed with an irradiance of 50 kW/m$^2$ with edge frame and grid. The results are set out in Table 3

TABLE 3

| FORMULATION | Commercial Flamtard S | Flamtard Heated 250° C., 2 hours |
|---|---|---|
| Time to ignition (s) | 23 | 25.5 |
| Peak of heat released (kWm$^{-2}$) | 157.5 | 136.5 |
| Tota heat released (MJm$^{-2}$) | 91.05 | 86.34 |
| Specific extinction area (m$^2$kg$^{-1}$) | 753 | 682 |
| COI (% O$_2$) | 29.9 | 31.1 |
| Voiume resistivity, K value (Mohm.km) | 430.7 | 954 |

EXAMPLE 4

The following Table 4 gives surface area and particle size data for various materials. Flamtard H and Flamtard S are the commercial products. 250, 285 and 310 are products formed by heating Flamtard H at 250° C., 285° C. and 310° C. respectively.

TABLE 4

| | Surface Area m$^2$/g | Median Particle Size μm |
|---|---|---|
| Flamtard H | 14.0 | 1.5–3.0 |
| Flamtard S | — | 1.5–3.0 |
| 250 | 17–35 | 1.5–3.0 |
| 285 | 31–73 | 1.5–3.0 |
| 310 | 46–65 | 1.5–3.0 |

EXAMPLE 5

The following formulation was made up (amounts in g):

| | |
|---|---|
| PVC (DS7060) | 195 |
| Dioctyl phthalate | 81 |
| ESO | 10 |
| Stabiliser (Irgastab EZ 712) | 10 |
| Huntite | 72.4 |
| Aluminium trihydroxide (SF4E) | 75.2 |
| Clay (Whitex) | 74.6 |
| Flame reatardant (varies) | 28.6 |

As flame retardants were used: Flamtard H; Flamtard S; and a product (HS-250 (2)) made by heating Flamtard H in a laboratory oven for 2 hours at 250° C.

Plaques for testing were made as described in Example 1. Irradiance for cone calorimetry testing was at 40 kW/m$^2$. Results are set out in Table 5.

TABLE 5

| Flame Retardant | H | S | HS-250(2) |
|---|---|---|---|
| Time to Ignition (secs) | 84 | 74.5 | 85.5 |
| Peak rate of heat release (kW/m$^2$) | 87 | 122 | 78 |
| Average specific extinction area (m$^2$/kg) | 229 | 297 | 157 |
| Total smoke released | 800 | 1089 | 635 |
| Fire Performance index (m$^2$s/kW) | 0.96 | 0.62 | 1.10 |
| Smoke Parameter (MW/kg) | 19.9 | 36.0 | 12.2 |

All these properties of HS-250(2) were distinctly better than of either H or S.

EXAMPLE 6

The following formulation was made up (parts are per hundred of PVC):

| | |
|---|---|
| PVC | 100 |
| Ca/Zn stabiliser | 5 |
| Kaolin | 5 |
| CaCO$_3$ | 40 |
| Cereclor S52 | 13 |
| DIDP | 40 |
| Flame retardant | 5 |

The following flame retardants were used:

Flamtard H (zinc hydroxystannate)

Flamtard S (zinc stannate)

T-28FD—Flamtard H heated at 280° C. in a spin flash dryer.

T-28-4RC—Flamtard H heated at 280° C. for 4 minutes on a rotary calciner.

T-28-25RC—Flamtard H heated at 280° C for 25 minutes on a rotary calciner.

Critical Oxygen Index and electrical resistivity (k values) properties after 2 days are reported in Table 6.

TABLE 6

| Property | COI (% O$_2$) | κ Value (Mohms.km) |
|---|---|---|
| Flamtard H | 29.8 | 243 |
| Flamtard S | 29.1 | 162 |
| T-28FD | 29.3 | 290 |
| T-28-4RC | 29.9 | 551 |
| T-28-25RC | 29.3 | 405 |

The electrical properties of H and S are distinctly inferior to the others.

EXAMPLE 7

The following formulation was made up (parts per hundred of PVC):

| | |
|---|---|
| PVC (DS 7060) | 100 |
| DOP | 30 |
| Cereclor S52 | 20 |
| Calcium carbonate | 60 |
| CD33 (EZ 712) | 5 |
| Flame retardant | 5 (when used) |

The flame retardants used were: Flamtard H; Flamtard S; and a 50:50 mixture of the two (H/S (5:50)).

Procedure:

Five samples were compounded following the formulation shown above using a Two-Roll-Mill at 140° C. 2 and 3 mm plaques were compression moulded at 150° C. for 1 minute close and then 3 minutes under 20 tonnes pressure. Plaques were rested for 16 hours before testing.

10 small tensile dumbbells and 10 tear test pieces were cut from the 2 mm thickness plaque to test their mechanical properties. Tensile test was carried out under 250 mm/min speed and 5N pre-load. The speed for tear resistance test was 400 mm/min with a 5N pre-load.

Cone calorimeter testing was performed using a 40 kW/m$^2$ heat flux. Results are set out in Table 7.

TABLE 7

| Flame Retardant | None | H/S (50:50) | H | S |
|---|---|---|---|---|
| Time to Ignition (s) | 45 | 51.5 | 48.5 | 51.5 |
| Peak Heat Release (kW/m$^2$) | 169.3 | 145.1 | 144.5 | 154.2 |
| Time to Peak HRR (s) | 152.5 | 180 | 170 | 167.5 |
| Peak rate of smoke release (1/s) | 12.57 | 9.32 | 9.35 | 10.43 |
| Total smoke release | 2646 | 2281 | 2378 | 2337 |
| Fire performance index (sm$^2$/kW) | 0.266 | 0.355 | 0.336 | 0.334 |
| Tensile Strength at Yield (MPa) | 15.8 | 16.9 | 16.2 | 15.2 |
| Elongation at Yield (%) | 166.4 | 173.5 | 172.9 | 168.8 |

The performance of H/S (50:50) was somewhat better than of H or S.

EXAMPLE 8

The PVC formulation and processing were as in Example 7. The flame retardants used were: Flamtard H; Flamtard S; and a product HS-250(1) made by heating Flamtard H for 1 hour at 250° C.

Critical oxygen index (COI) was tested following BS 2782 in 3 mm thickness and 10 mm wide strips.

Specific optical density was determined using NBS smoke box with sample dimensions of 75×75×3 mm.

Results are set out in Table 8.

TABLE 8

| Flame Retardant | None | H | S | HS-250 (1)4 |
|---|---|---|---|---|
| Tensile Strength at Yield (MPa) | 15.8 | 16.2 | 15.2 | 16.3 |
| Elongation at Yield (%) | 166.4 | 172.9 | 168.8 | 190.4 |
| Specific Optical Density (D$_{max}$) | 366 | 291 | 311 | 284 |
| COI (% O$_2$) | 28.8 | 31.9 | 29.4 | 32.0 |

The properties of HS-250(1) are better than those of H or S.

EXAMPLE 9

The following formulations were made up (in % by weight):

| | 1 | 2 |
|---|---|---|
| Nylon | 79 | 79 |
| Dechlorate plus 25 | 15 | 15 |
| Flamtard S | 6 | |
| HS-250(2) | | 6 |

HS-250(2) was made by heating Flamtard H for two hours at 250° C.

Samples were subjected to a 125 mm vertical burn test with a UL-94-5VA classification. Both formulations passed the horizontal requirements of the test. Formulation I failed, but formulation 2 passed the vertical requirements.

EXAMPLE 10

Flamtard H was compared to HS-300 (3) (obtained by heating Flamtard H for 3 hours at 300° C.) in an EPDM/EVA flooring compound. The exact formulation is not known, but it probably contained a large proportion of aluminium trihydroxide. Results are set out in Table 9.

TABLE 9

| | 10 phr Flamtard H | 10 phr HS-300 (3) |
|---|---|---|
| COI (% O$_2$) | 55.7 | 60.3 |
| Specific optical density | 130 | 127 |

The COI figure for HS-300(3) is considerably better than H.

What is claimed is:

1. A divalent metal stannate product which has a loss on ignition of 2–17% by weight, but less than the loss on ignition of the corresponding divalent metal hydroxystannate, said product in packaged form for use as a flame-retardant additive.

2. A divalent metal stannate product as claimed in claim 1, having the formula MSnO$_3$.xH$_2$O where M is a divalent metal and x is 0.4–2.6.

3. A divalent metal stannate product as claimed in claim 1, wherein the divalent metal is Zn.

4. A divalent metal stannate product as claimed in claim 1, which is a mixture of 90–10 wt % of zinc hydroxy stannate with 10–90 wt % of zinc stannate.

5. A polymer formulation containing an effective concentration of a flame-retardant additive which is the divalent metal stannate product according to claim 1.

6. A polymer formulation containing an effective concentration of a flame-retardant additive which consists of 90% to 10% by weight of the divalent metal stannate product according to claim 1 and correspondingly 10% to 90% by weight of a divalent metal borate.

7. A polymer formulation as claimed in claim 5, wherein the flame-retardant additive is present in a concentration of 1–30% by weight.

8. A method of making the divalent metal stannate product of claim 1, which method comprises heating a corresponding divalent metal hydroxy stannate at a temperature of 200–350° C.

9. A method as claimed in claim 8, wherein zinc hydroxy stannate is heated for 30 minutes to 5 hours.

10. A polymer formulation containing an effective concentration of a flame retardant additive which consists of 90–10 wt % of zinc hydroxystannate with 10–90 wt % of zinc stannate.

11. A polymer formulation as claimed in claim 6, wherein the flame-retardant additive is present in a concentration of 1–30% by weight.

12. A method of making the divalent metal stannate product of claim 1, which method comprises mixing together a corresponding divalent metal hydroxy stannate and divalent metal stannate in suitable proportions.

* * * * *